United States Patent
Massey (10) Patent No.: US 6,575,488 B2
(45) Date of Patent: Jun. 10, 2003

(54) VERTICALLY ADJUSTABLE TRAILER HITCH

(76) Inventor: Randy A. Massey, 226 Quimby Rd., Coldwater, MI (US) 49036

(*) Notice: Subject to any disclaimer, the term of this patent is extended or adjusted under 35 U.S.C. 154(b) by 0 days.

(21) Appl. No.: 09/832,265

(22) Filed: Apr. 10, 2001

(65) Prior Publication Data
US 2001/0038191 A1 Nov. 8, 2001

Related U.S. Application Data
(60) Provisional application No. 60/196,238, filed on Apr. 10, 2000.

(51) Int. Cl.$^7$ ................................................. B60D 1/46
(52) U.S. Cl. .................................................. 280/490.1
(58) Field of Search ........................ 280/490.1, 491.1, 280/491.5, 511, 515

(56) References Cited

U.S. PATENT DOCUMENTS

| | | | |
|---|---|---|---|
| 2,847,232 A | | 8/1958 | Graham |
| 3,269,751 A | | 8/1966 | Whattoff |
| 3,400,949 A | | 9/1968 | Kendall |
| 3,655,221 A | | 4/1972 | Warner |
| 3,708,183 A | | 1/1973 | Jones |
| 3,865,406 A | * | 2/1975 | Dutton .................... 280/490.1 |
| 3,922,006 A | | 11/1975 | Borges |
| 4,033,601 A | | 7/1977 | Lindahl et al. |
| 4,078,823 A | | 3/1978 | McBride |
| 4,103,928 A | | 8/1978 | Sheppard, Jr. |
| 4,148,498 A | | 4/1979 | Taylor, Jr. |
| 4,157,189 A | | 6/1979 | Poley |
| 4,215,876 A | | 8/1980 | Jacks |
| 4,266,799 A | | 5/1981 | Wood |
| 4,373,847 A | * | 2/1983 | Hipp et al. ................... 14/71.1 |
| 4,662,647 A | | 5/1987 | Calvert |
| 5,354,087 A | * | 10/1994 | Head ....................... 280/490.1 |
| 5,358,269 A | | 10/1994 | Jakeman et al. |
| 5,413,366 A | | 5/1995 | Gibbons |
| 5,975,553 A | | 11/1999 | Van Vleet |
| 6,116,631 A | * | 9/2000 | Logan et al. .................. 280/43 |

FOREIGN PATENT DOCUMENTS

EP 179422 A1 * 4/1986

* cited by examiner

Primary Examiner—Kevin Hurley
(74) Attorney, Agent, or Firm—Flynn, Thiel, Boutell & Tanis, P.C.

(57) ABSTRACT

A trailer hitch arrangement includes a support unit which is mountable to a vehicle and has a vertically elongate support plate. A hitch assembly is provided which includes a slide bracket that is slidably engaged with the support plate and includes a hitch support which supports the trailer hitch of the vehicle being towed. The hitch assembly includes upper and lower stops that define respective upper and lower limits of travel of the slide bracket as the slide bracket slides along the support plate. One of the upper and lower stops is manually disengagable to permit removal of the slide bracket from the support plate and a lock member is provided which removably secures the hitch assembly to the support unit at a selected elevation.

27 Claims, 11 Drawing Sheets

VERTICALLY ADJUSTABLE TRAILER HITCH

CROSS REFERENCE TO RELATED APPLICATION

This application claims the benefit of U.S. Provisional Application No. 60/196,238, filed Apr. 10, 2000.

FIELD OF THE INVENTION

The invention relates to vehicle towing hitches, and more particularly, to demountable trailer hitches which are vertically adjustable.

BACKGROUND OF THE INVENTION

Many different types of vehicle hitches are provided for towing vehicle such as trailers and the like. While trailer hitches may be permanently affixed to the vehicle, it is preferable to provide a demountable trailer hitch which can be removed when not in use.

Such demountable trailer hitches typically have a tubular receiver on the vehicle which extends horizontally and opens rearwardly. The receiver is located in an area disposed closely adjacent to a rear bumper of the vehicle, and securely receives a support bar of a hitch assembly therein.

To accommodate various types and sizes of trailers, it is known to provide a hitch assembly which is vertically adjustable. Such a hitch assembly typically includes a vertically elongate tube or plate having a pattern of vertically spaced apart holes through which bolts or pins are inserted to securely fix the hitch assembly at a desired elevation relative to the bumper.

However, these known hitch assemblies typically do not include vertically spaced apart stops that define the upper and lower limits of travel of the hitch assembly which stops prevent inadvertent disengagement of the hitch assembly during the had adjustment process. Further, it is desirable to provide a greater range of vertical travel. Accordingly, it is an object of the invention to overcome some of the disadvantages associated with adjustable trailer hitches.

The trailer hitch of the invention overcomes the above-discussed disadvantages by providing upper and lower stops which define the limits of travel of the trailer hitch during adjustment. These upper and lower stops prevent inadvertent disengagement of the trailer hitch. The stops permit ready sliding of the hitch assembly, and at least one of the stops is readily disengagable to permit removal of the hitch assembly where desired.

Also, the inventive trailer hitch includes multiple, vertically spaced locations for the lock pins which further increase the range of vertical travel of the hitch ball.

Other objects and purposes, and variations thereof, will be apparent upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 1:
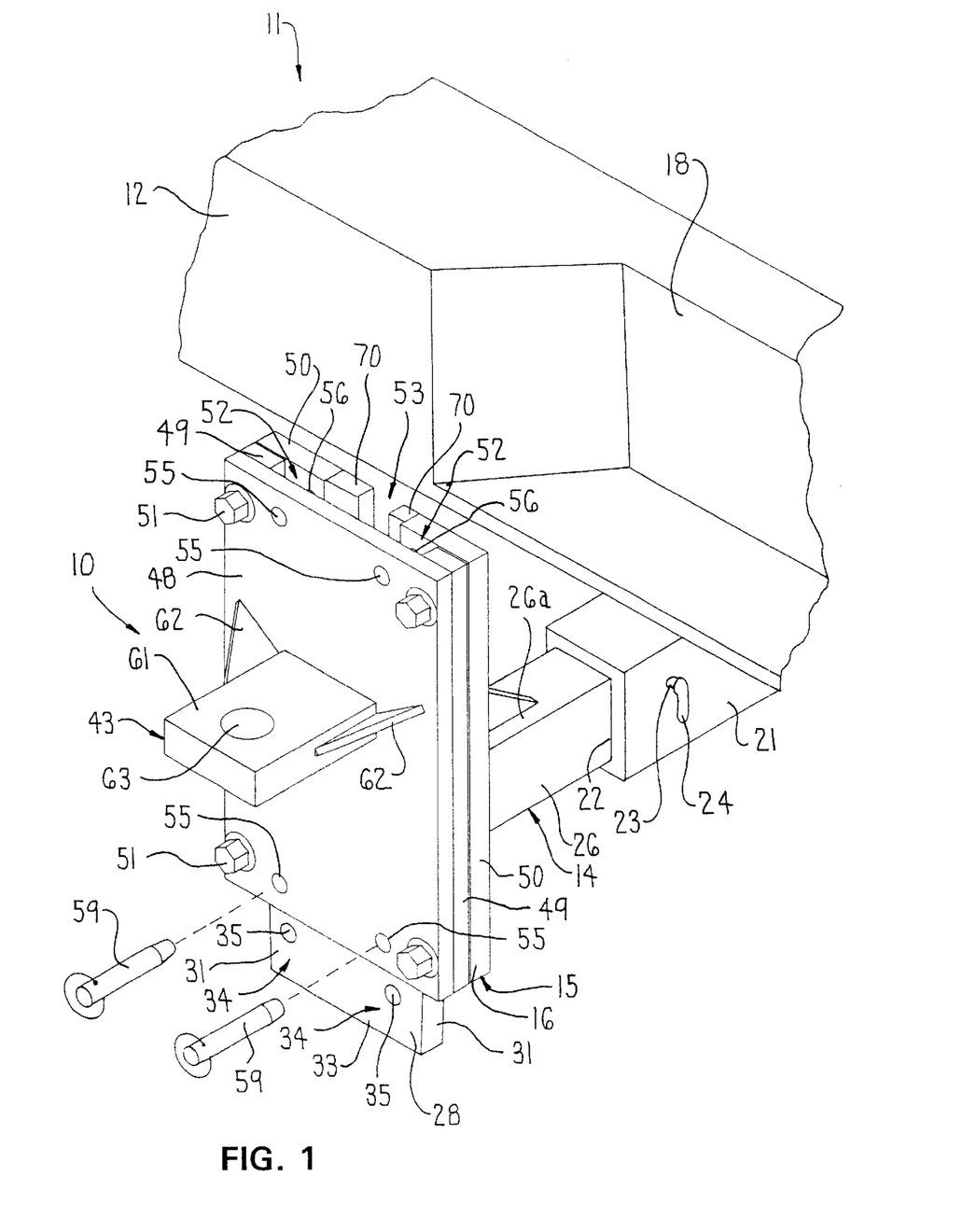
FIG. 1 is an exploded partial perspective view of the height-adjustable trailer hitch of the invention illustrating a hitch assembly secured to a receiver.

Referring to FIG. 1, the trailer hitch 10 of the invention is mounted to a vehicle 11 just below the bumper 12 thereof. The trailer hitch 10 includes a fixed support unit or vehicle mount 14 and a vertically movable hitch assembly 15 having a slide bracket 16 engaged with the support unit 14. This trailer hitch 10 permits vertical adjustment to accommodate different types and constructions of vehicles being towed.

Generally, the vehicle 11 is a towing vehicle and the bumper 12 is the rear bumper thereof. The bumper 12 may be of any conventional construction and often includes a central step 18 which may be used for mounting a license plate on the vertical surface thereof and/or a hitch ball on the horizontal surface thereof for low capacity loads.

The trailer hitch 10 preferably is located just below the rear bumper 12 and projects rearwardly therefrom for engagement with a towed vehicle (FIG. 2) such as a trailer. To support the trailer hitch 10 on the towing vehicle 11, the trailer hitch 10 includes a tubular receiver 21. The receiver 21 is secured to the frame of the vehicle 11 in a conventional manner.

The receiver 21 preferably is a square tubular member having a receiver opening 22 which opens rearwardly from the back of the vehicle 11 and defines a horizontal passage. The receiver 21 also includes horizontally aligned apertures 23 which extend sidewardly through the opposite side walls of the receiver 21 and are adapted to receive a lock pin 24 horizontally therethrough.

Figure 2:
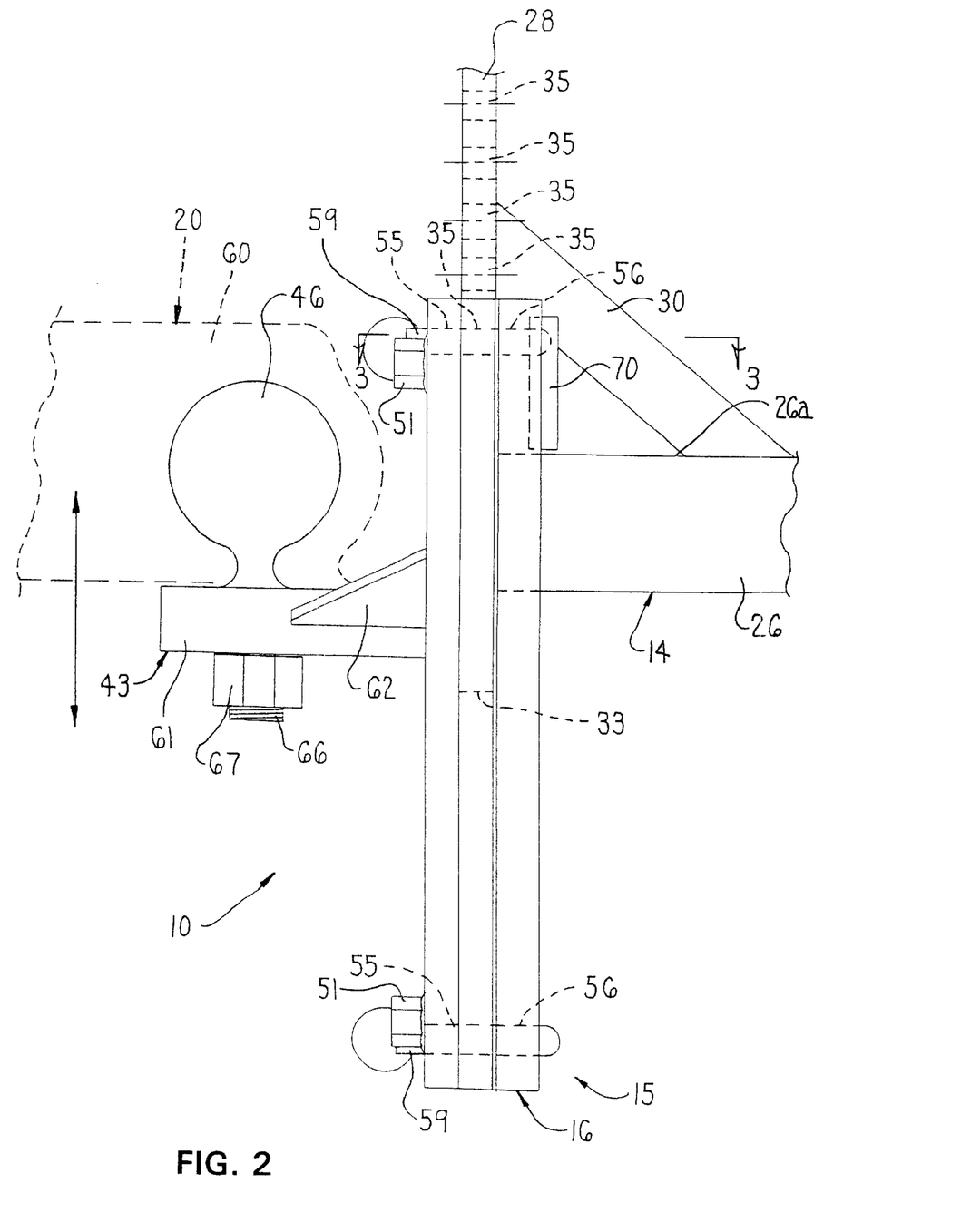
FIG. 2 is a side elevational view of the hitch assembly illustrating the tongue of a towed vehicle such as a trailer secured to a hitch ball of the hitch assembly.
Figure 3:
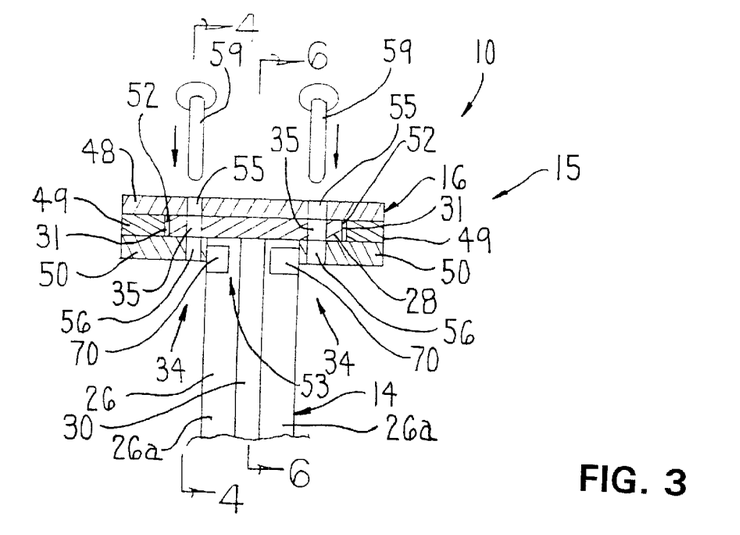
FIG. 3 is a partial top view in cross-section illustrating a slide bracket slidably mounted to a support plate as taken along line 3—3 of FIG. 2.

The hitch assembly 15 is mounted to the receiver 21 first by engaging the support unit 14 thereto. Referring to FIGS. 1–3, the support unit 14 includes a horizontally elongate support bar 26 which slides into the receiver opening 22.

In particular, the support bar 26 has a rectangular shape that corresponds to the receiver opening 22 and the forward end of the support bar 26 is inserted into the receiver opening 22 in a conventional manner. The support bar 26 includes a lock opening or bore which aligns with the apertures 23 of the receiver 21 so that the lock pin 24 extends horizontally through the side walls of the receiver 21 and the entire width of the support bar 26 disposed therebetween. As such, the support bar 26 is removably mounted to the receiver 21.

To support the slide bracket 16 on the support unit 14, the support unit 14 includes a vertically enlarged support plate or support member 28 which is fixed to the free end of the support bar 26. In particular, the support plate 28 is a rectangular plate which is fastened to the support bar 26, preferably by welding, so that the support plate 28 is oriented substantially vertical relative to the support bar 26. It is understood that the support member 28 may be any suitable material such as steel tubing, bars or pipe.

The support plate 28 is vertically offset relative to the support bar 26 wherein a greater portion of the support plate 28 is located above the support bar 26 than below. To strengthen the support plate 28, the support unit 14 further includes a brace 30 which is welded to the top surface 26a of the support bar 26 and the front surface of the support plate 28.

The support plate 28 is defined by opposite side edges 31 and upper and lower edges 32 and 33 respectively. Further, two rows 34 of vertically spaced apart apertures 35 are defined therein. Each of the rows 34 is defined close to and extends generally parallel to the respective side edge 31, and each of the apertures 35 opens horizontally through the thickness of the support plate 28.

Figure 6:
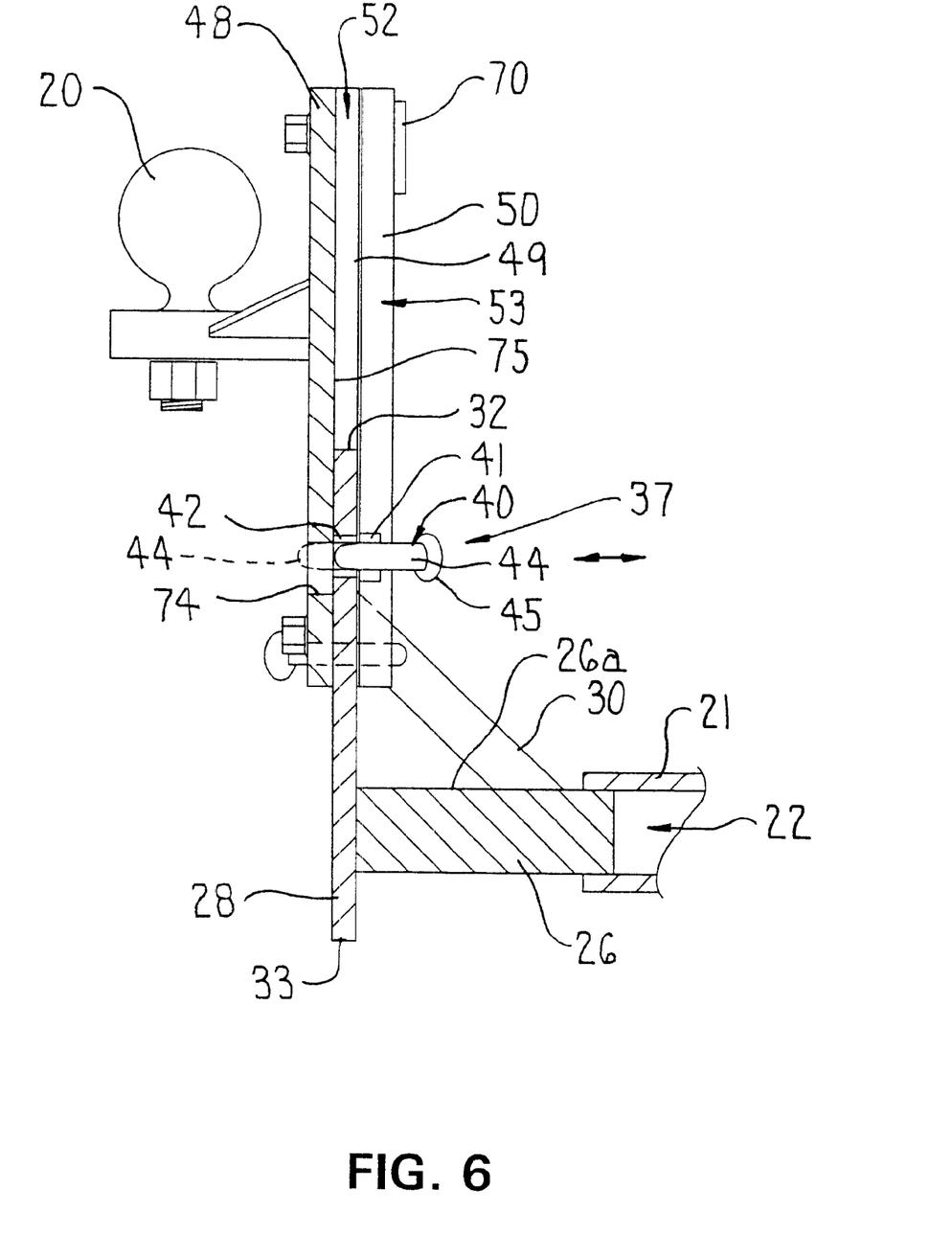
FIG. 6 is a side elevational view in cross-section of the hitch assembly illustrating an arrangement of an upper-limit stop as taken along line 6—6 of FIG. 3.
Figure 7:
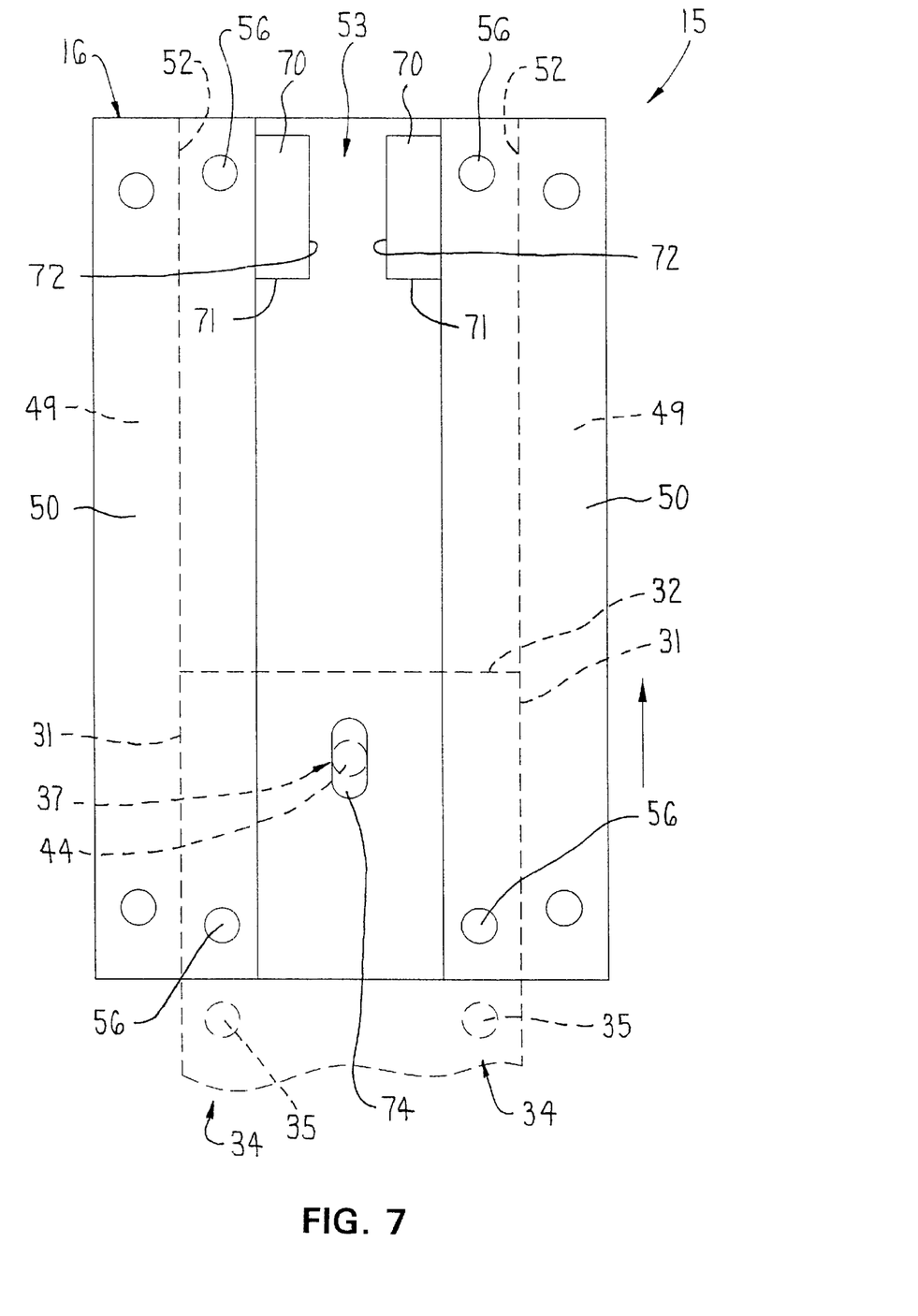
FIG. 7 is a rear elevational view illustrating the upper-limit stop arrangement.

Referring to FIGS. 6 and 7, the support plate 28 also includes an upper-limit stop 37 which stops the slide bracket 16 at the uppermost extent of travel as defined in more detail herein. The upper-limit stop 37 is a commercially-available spring-loaded pull pin unit 40 which is located proximate the upper edge 32 of the support plate 28.

The pull pin unit 40 includes a smooth housing 41 which inserts into a bore 42 defined centrally in the support plate 28 and is welded in place. Further, the pull pin unit 40 includes a spring-loaded plunger or stop pin 44 which extends horizontally through the support plate 28. The plunger 44 is biased rearwardly or inwardly toward an engaged or stop position (as illustrated in phantom outline in FIG. 6). Further, the outer end of the plunger 44 includes a pull ring 45 which allows the plunger 44 to be manually pulled outwardly to a disengaged or release position (as illustrated in solid outline in FIG. 6).

Generally, the slide bracket 16 supports connector means 43 which comprises a hitch ball 46 (FIG. 2) thereon. The slide bracket 16 is slidably supported on the support unit 14 to adjust the vertical elevation of the hitch ball 46 which elevation depends upon the particular type of vehicle 20 being towed.

The slide bracket 16 is formed of a main wall 48, a pair of vertically elongate edge spacers 49 which extend along the opposite side edges of the main wall 48, and a pair of channel walls 50 which extend inwardly toward each other from the respective spacers 49. More particularly, the main wall 48, spacers 49 and channel walls 50 are fixedly secured together to generally define a C-shape when viewed from above (FIG. 3). This C-shape thereby defines a pair of vertical guide channels 52 which are defined by the opposing, spaced apart surfaces of the main wall 48 and channel walls 50. A central slot 53 is defined by the opposing, spaced apart edge surfaces of the channel walls 50.

Figure 4:
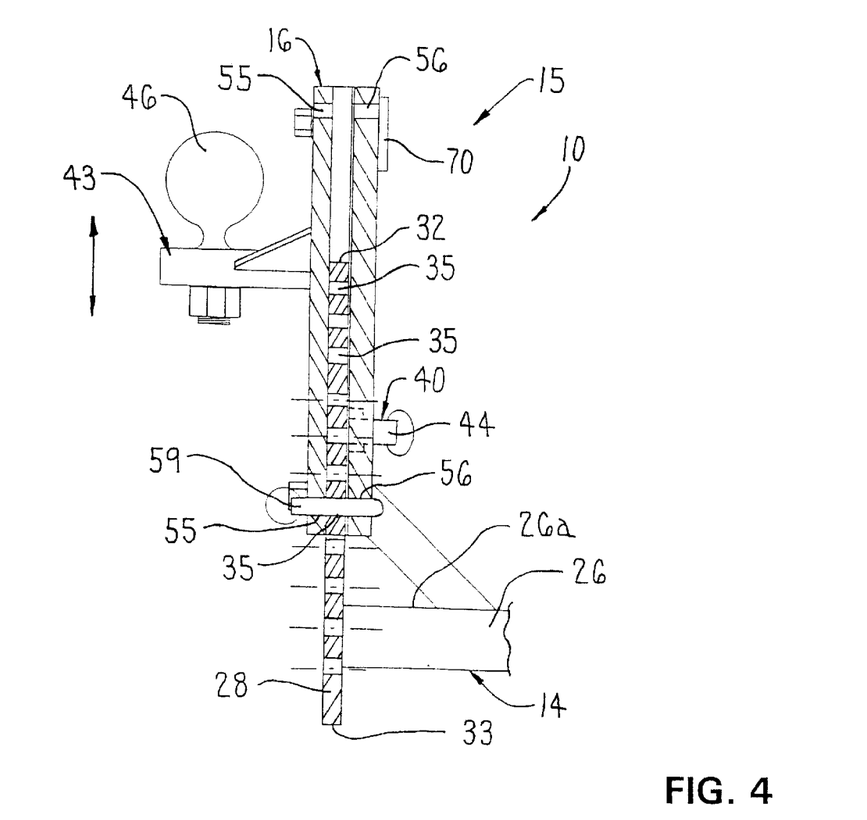
FIG. 4 is a side elevational view in cross-section of the hitch assembly in a raised position as taken along line 4—4 of FIG. 3.
Figure 5:
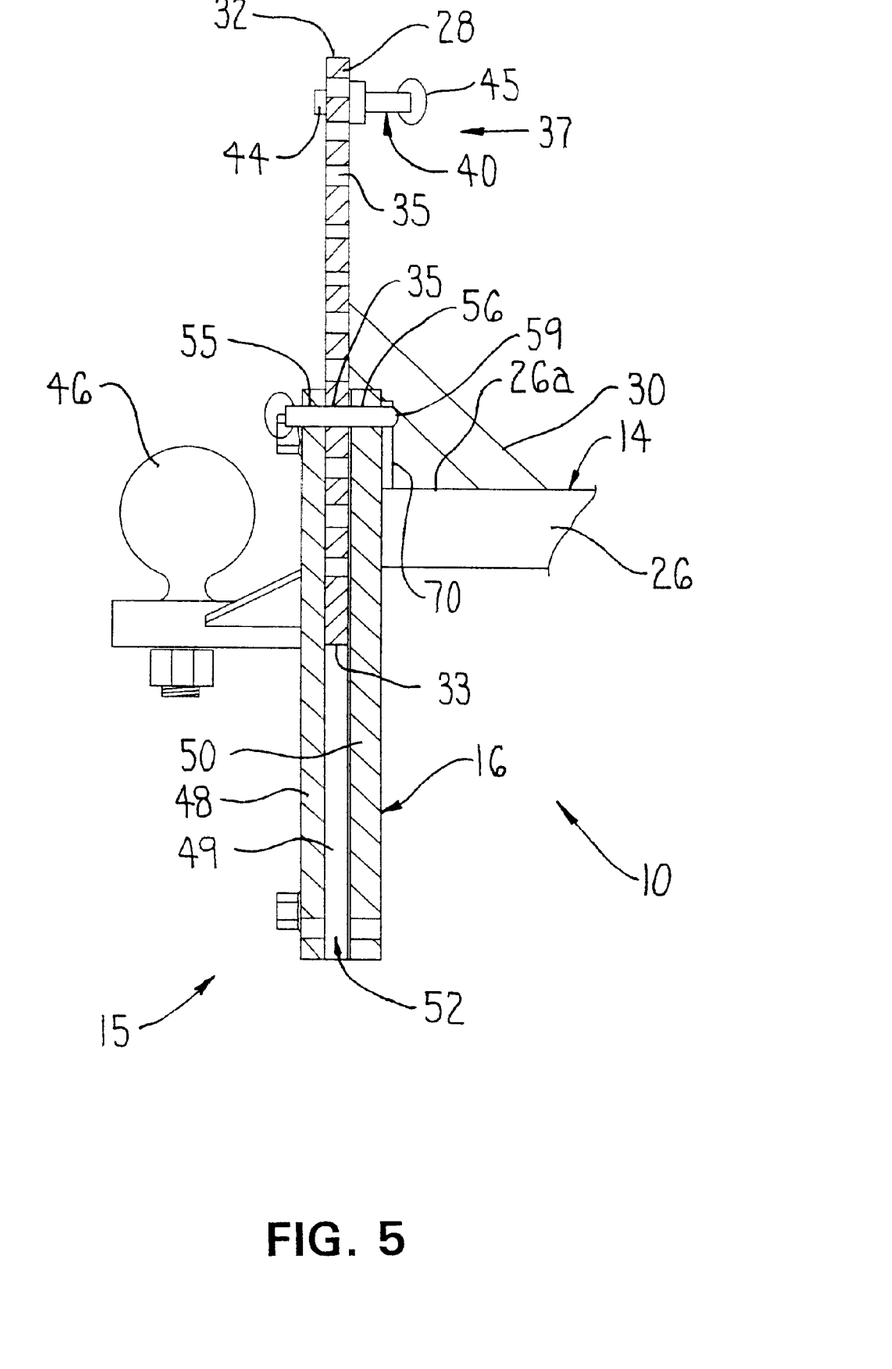
FIG. 5 is a side elevational view in cross-section of the hitch assembly in a lowered position.

The guide channels 52 open inwardly towards each other so as to receive the support plate 28 therein with the opposite side edges 31 of the support plate 28 being confined by the guide channels 52. In particular, as seen in FIG. 3, the width of the support plate 28 is proximate the distance between the spacers 49 so that the support plate 28 is slidably received within the guide channels 52. The guide channels 52 open vertically from the top and bottom of the slide bracket 16 so that the support plate 28 may project outwardly out of the bottom of the slide bracket 16 (as seen in FIG. 4), or upwardly out of the top (as seen in FIG. 5).

Further, the width of the central slot 53 generally corresponds to the width of the support bar 26. As such, when the support plate 28 is slidably received within the guide channels 52, the support bar 26 may extend rearwardly out of the central slot 53 while being vertically slidable along the central slot 53 when adjusting the hitch ball height.

The edges 31 of the support plate 28 fit closely into the guide channels 52 so as to permit sliding while still accommodating the torsional loads placed on the hitch assembly 15 when the hitch ball 46 is loaded.

The drawings illustrate the main wall 48, spacers 49 and channel walls 50 being held together by bolts 51. Preferably, an additional pair of bolts 51 is provided halfway between the upper and lower pairs of bolts 51. To provide further strength, these components also are welded together since these components are formed of plate steel.

To lock the slide bracket 16 at a selected elevation relative to the support plate 28, a locking arrangement is provided. In the preferred locking arrangement, the main wall 48 includes an upper pair of apertures 55 and a lower pair of apertures 55. Additionally, the guide channels 52 include similar pairs of upper and lower apertures 56 which are aligned with the apertures 55. As a result, the slide bracket 16 includes upper and lower sets of aligned apertures 55, 56.

Each set of aligned apertures 55, 56 also aligns with a corresponding pair of the apertures 35 formed in the support plate 28. A pair of lock pins 59 is provided, which pins 59 are inserted forwardly through the aligned apertures 55, 35 and 56 to lock the slide bracket 16 at a selected elevation relative to the support plate 28.

Since the support plate 28 includes rows of vertically spaced apertures 35, the slide bracket 16 may be positioned in a raised position, for example, as seen in FIG. 4 or a lower position, for example, as seen in FIG. 5. In this regard, the two lock pins 59 are located either in the lower pair of apertures 55 as seen in FIG. 4 or else in the upper pair of apertures 55 as seen in FIG. 5.

By providing upper and lower sets of apertures 55, 56, the range of vertical travel is increased. In particular, the upper set of apertures 55, 56 maximizes the amount of upward travel. At the same time, a significant amount of the support plate 28 is still engaged with the slide bracket 16 so that the guide channels 53 carry the torsional loads from the hitch ball 46. Similarly, the lower set of apertures 55, 56 maximizes the amount of downward travel.

To support, for example, the tongue 60 (FIG. 2) of a trailer 20, the connector means 43 further comprises a hitch platform 61 which projects horizontally from the main wall 48 in cantilevered relation. A pair of gussets 62 strengthens the platform 61. The platform 61 further includes a vertical bore 63 through which the shank 66 of the hitch ball 46 is inserted. The hitch ball 46 is secured to the hitch platform 61 by a conventional threaded nut 67. Alternatively, the bore 63 also could have interior threads for direct engagement with the shank 66.

With the above-described arrangement, the elevation of the hitch ball 46 relative to the rear bumper 12 of the vehicle 11 can be readily adjusted. In particular, adjustment is accomplished by removing the pins 59 and shifting the slide bracket 16 vertically along the support plate 28. Once the hitch ball 46 is at its desired height, the lock pins 59 are reinserted through the aligned apertures 55, 56 and 35.

More particularly, as to the vertical movement of the slide bracket 16 and attached hitch ball 46, the slide bracket 16 thereby has a vertically enlarged height which allows the lower apertures 55 to be engaged with those apertures 35 located above the support bar 26. Similarly, the upper pair of apertures 55 may be secured to those apertures 35 located proximate or below the support bar 26 to secure the slide bracket 16 at a relatively lower height. This arrangement of alternative upper and lower apertures 55 thereby provides an increased range of vertical travel.

Further, the range of lower travel may be increased further by flipping the slide bracket 16 over. In particular, the support bar 26 is square so that the slide bracket 16 is inverted. Since the support plate 28 is offset vertically relative to the support bar 26, the support plate 28 would then extend downwardly a greater distance which further increases the lower limit of vertical travel.

While two lock pins 59 are typically used, since this number provides the greatest range of travel, four pins also may be used in the four apertures 55. This provides an increased load bearing capacity. When four pins 59 are used, however, this also limits the range of vertical travel since the apertures 55 only align with four respective apertures 35 of the support plate 28 in the middle of the travel range.

It will be understood that alternate locking arrangements may be provided. For example, the above-described arrangement could be modified so that the pins/holes are oriented sidewardly. Also, clamps could be provided. Further, vertical slots could be provided in the support member 28 and bolts provided through the holes 55 and the slots whereby the bolts are tightened down for locking. This arrangement would provide continuous adjustment of the hitch elevation.

In addition to the foregoing, the slide bracket 16 has predefined upper and lower limits of travel which thereby prevents the slide bracket 16 from being inadvertently removed or dropped from the support unit 14. In particular, the slide bracket 16 includes lower stop blocks 70 which project sidewardly from the upper edges of the channel walls 50. The stop blocks 70 have lower surfaces 71 which define stop surfaces.

Figure 8:
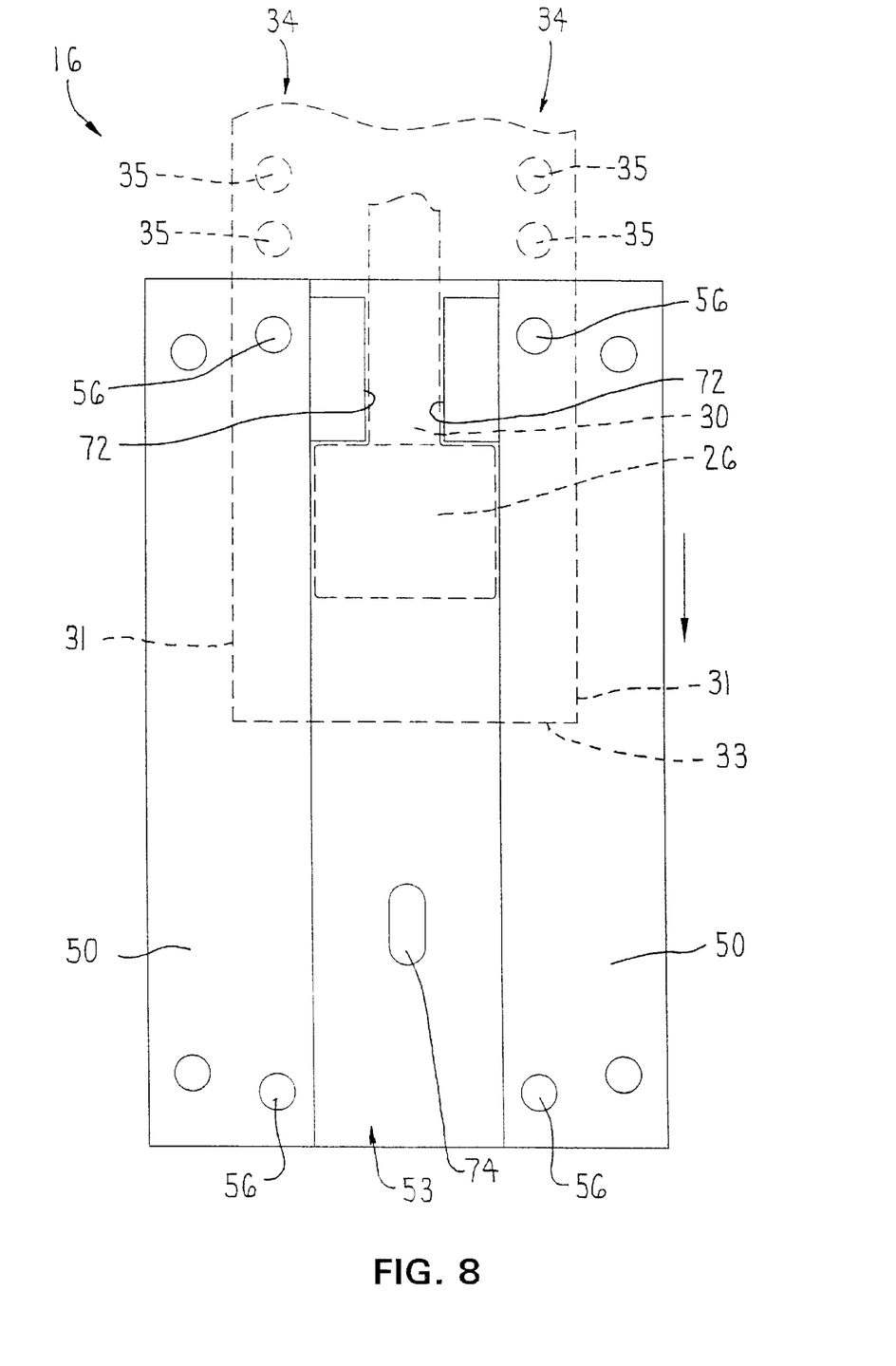
FIG. 8 is a rear elevational view illustrating a lower-limit stop arrangement.
Figure 9:
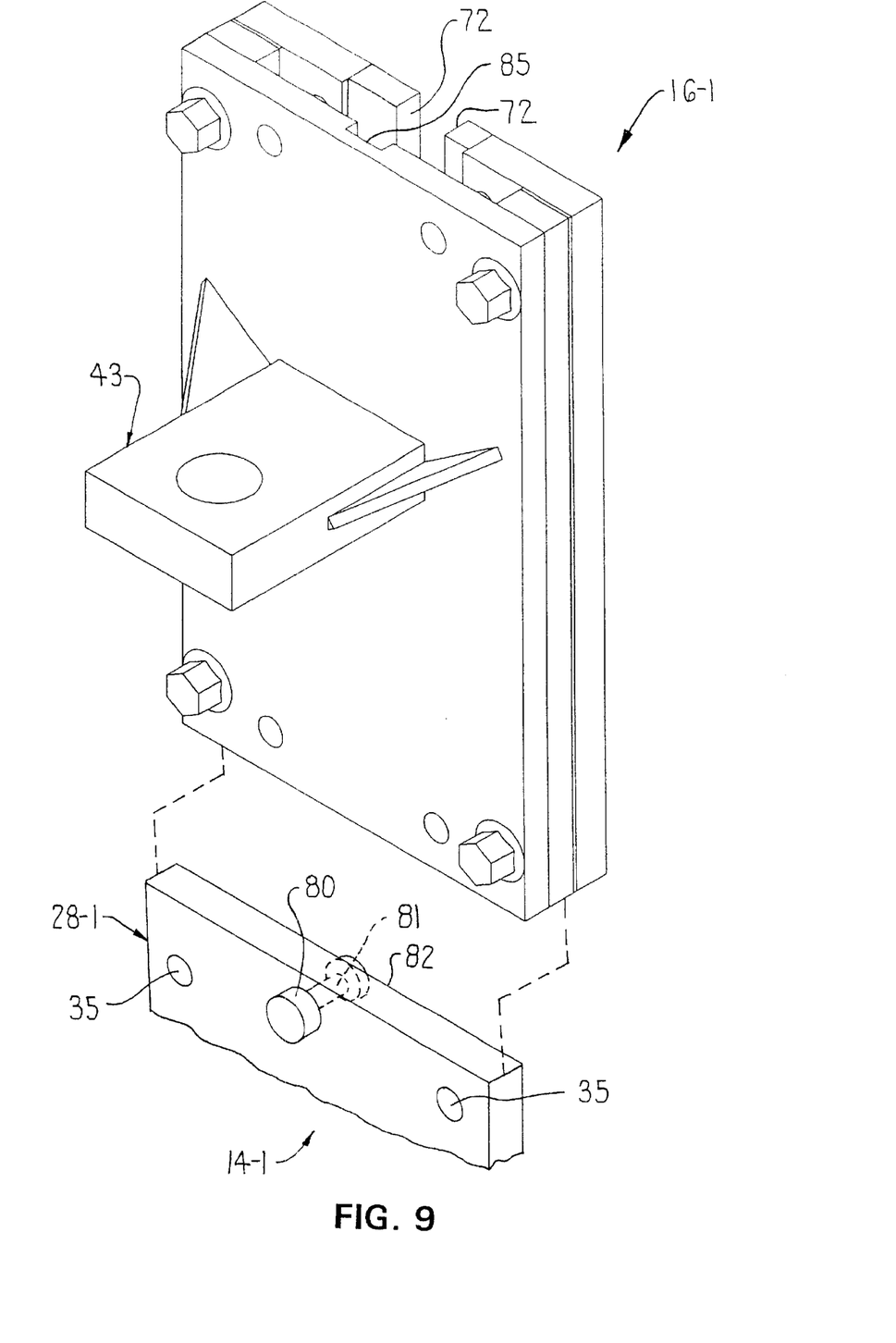
FIG. 9 is a perspective view illustrating an alternate embodiment of the trailer hitch of the invention.
Figure 10:
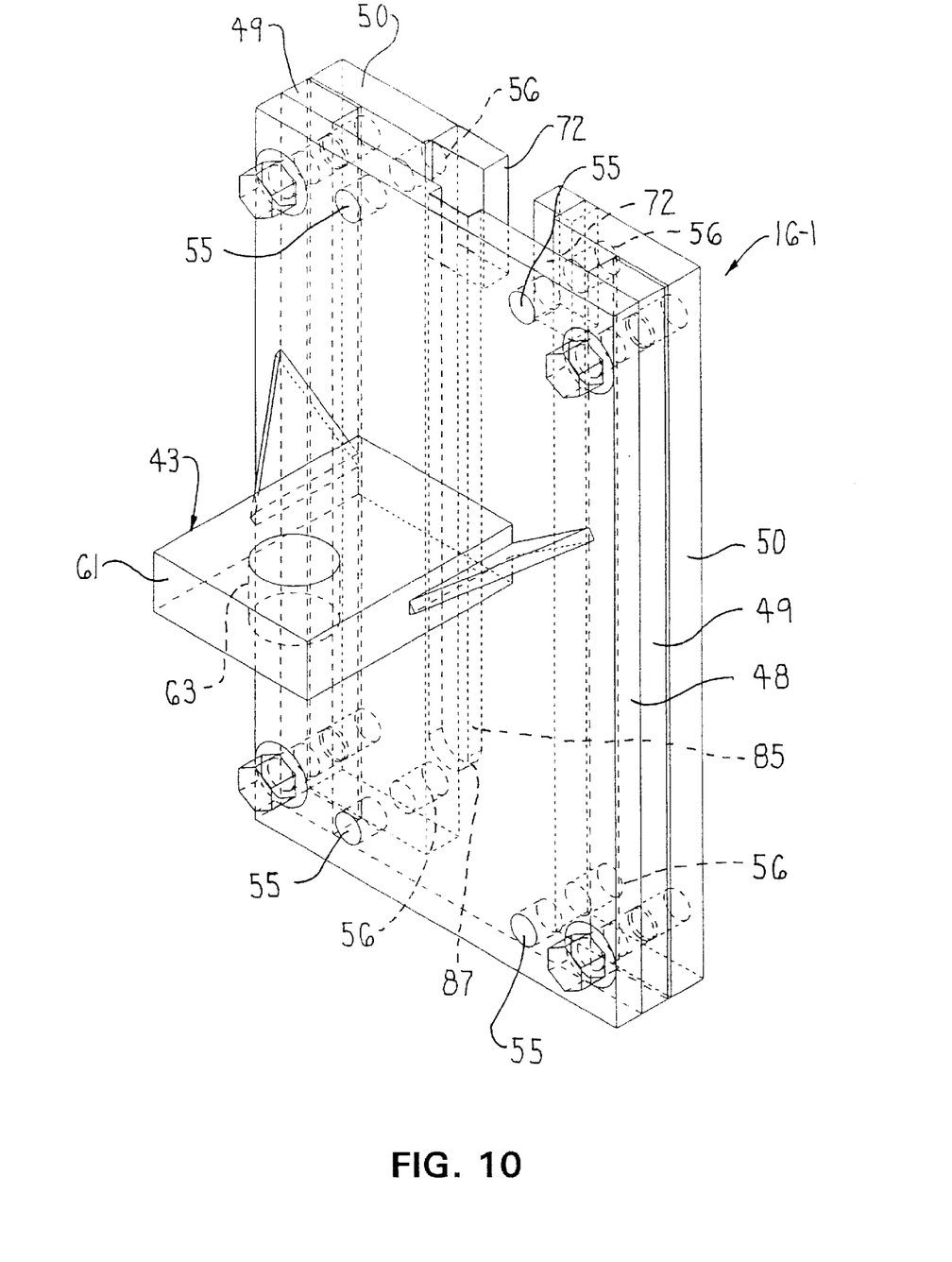
FIG. 10 is a perspective view illustrating the internal structures of the alternate embodiment in phantom outline.
Figure 11:
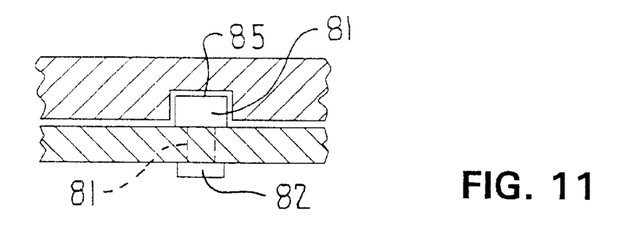
FIG. 11 is a partial top view in cross-section of an alternate upper-limit stop arrangement as taken along line 11—11 of FIG. 12.
Figure 12:
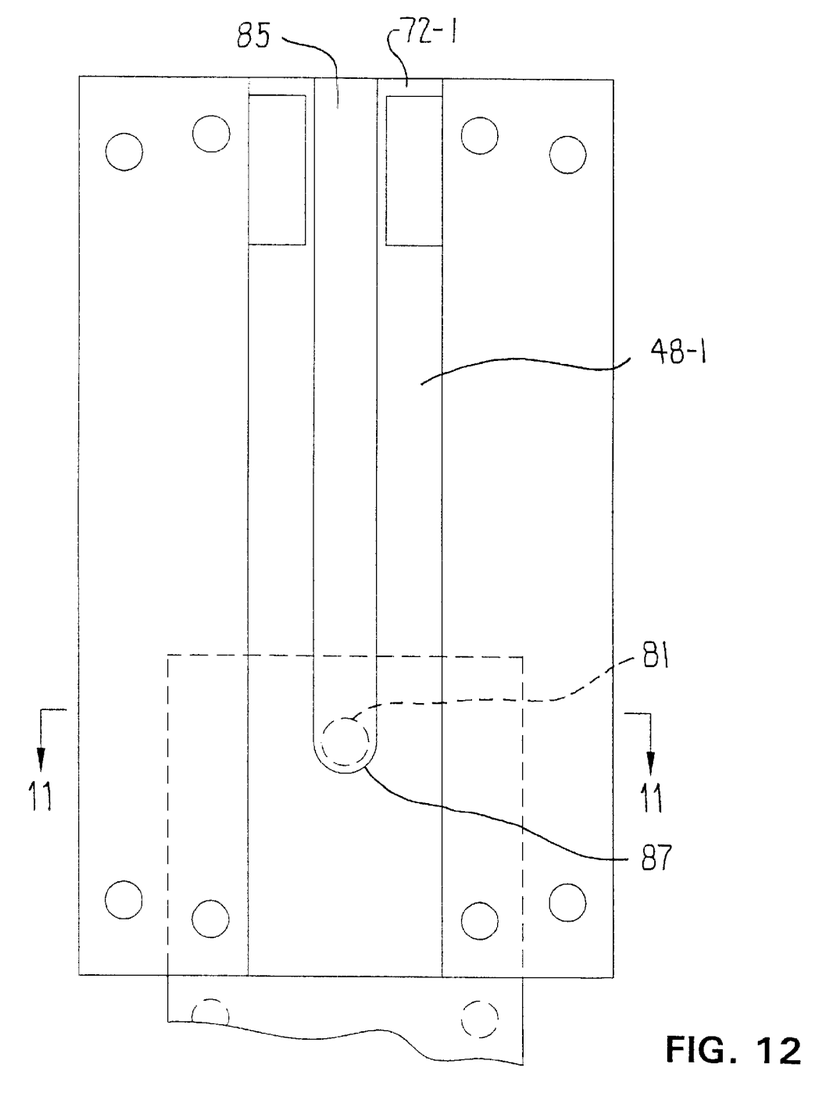
FIG. 12 is a rear elevational view of the upper-limit stop arrangement of FIG. 11.

The stop surfaces 71 are adapted to interfere with and strike the upper surfaces 26a of the support bar 26 as seen in FIGS. 5 and 8. Thus, the stop surfaces 71 rest on the upper bar surfaces 26a to define a lower limit of travel for the slide bracket 16. The stop blocks 70 do not interfere with the brace 30 since the stop blocks 70 have interior surfaces 72 that are sidewardly spaced apart from each other to permit the brace 30 to slide vertically therebetween as seen in FIG. 8.

To define the upper limit of travel, the main wall 48 further includes a stop slot 74 (FIGS. 6 and 7). The stop slot 74 is adapted to receive the plunger 44 of the pull pin unit 40.

More particularly, the plunger 44 is manually pulled outwardly to the release position to first permit assembly of the slide bracket 16 and support plate 28 together. Thereafter, the plunger 44 is released and in typical operation, contacts the inner face 75 of the main wall 48 and slides therealong during vertical adjustment of the height of the slide bracket 16. However, once the slide bracket 16 reaches the upper limit of travel as seen in FIG. 6, the plunger 44 then becomes aligned with the stop slot 74 and automatically is biased into the slot 74 to the engaged position illustrated in phantom outline. Then, the plunger 44 is manually released to again permit vertical sliding of the slide bracket 16 either downwardly to a new hitch ball elevation or upwardly for disassembly of the slide bracket 16 from the support plate 28.

The stop slot 74 preferably is vertically elongated to accommodate play which might exist between the support plate 28 and the slide bracket 16.

It also is possible to reverse the positions of the stop blocks 70 and stop slot 74 wherein the stop slot 74 would prevent downward movement of the slide bracket 16 while the stop blocks 70 would contact the bottom surface of the support bar 26 to prevent upward movement of the slide bracket 16. However, the illustrated arrangement is preferred since the stop blocks 70 automatically counter the effects of gravity on the slide bracket 16.

In other words, if the slide bracket 16 is released or dropped, the slide bracket 16 automatically stops at the support bar 26. Thus, if the plunger 44 is released but the slide bracket 16 is accidentally dropped, the stop blocks 70 are still operable as a safety stop. Thus, the arrangement of having a fixed stop at the lower limit and a disengagable stop at the upper limit provides additional safety.

During operation, the support unit 14 is mounted to the towing vehicle 11 by inserting the support bar 26 into the receiver 21. Thereafter, the slide bracket 16 is slid downwardly onto the support plate 28 of the support unit 14.

The slide bracket 16 is then raised or lowered as desired, and once the hitch ball 46 is at a desired elevation, the lock pins are inserted into the aligned apertures 55, 56 and 35. The use of the upper set of apertures 55, 56 versus the lower set of apertures 55, 56 depends upon the desired height of the slide bracket 16.

During assembly and disassembly, it is necessary to manually release or disengage the plunger 44 from the stop slot 74 since the plunger 44 is automatically engagable therewith. During adjustment, the upper and lower limits of travel are defined by the plunger 44 and stop blocks 70, one of these being a fixed stop and the other being a manually operable stop. If the slide bracket 16 is accidentally dropped, the user is protected since the stop blocks 70 in the preferred embodiment are always active or operable.

The foregoing arrangement thereby provides a trailer hitch arrangement which is safer to use but also provides a greater range of vertical travel.

Alternatively, the above-described components may be reversed wherein the slide bracket 16 is fixed to the support bar 26. The support plate 28 is slidably received in the slide bracket 16 and supports the connector means 43.

Referring to FIGS. 9–12, as another alternative to the above-described arrangement, the disengagable stop, i.e. the pull pin unit 40, on the support unit 14-1 may be replaced with a fixed pin 80. The fixed pin 80 has a threaded shank 81 and a nut 82 which is secured to the threaded shank to fix the pin 80 onto the upper edge region of the support plate 28.

As for the slide bracket 16-1, the fixed pin 80 is slidably perceived within a vertical slot 85 which is defined in the inner face 72-1 of the main wall 48-1. As the fixed pin 80 strikes the bottom end 87 of the slot 85, upward movement of the slide bracket 16-1 is prevented.

To assemble or disassemble the slide bracket 16-1 and the support unit 14-1, the slide bracket 16-1 is first dropped to the lower limit position. Then the fixed pin 80 is removed by removing the nut 82 typically with appropriate tools.

In still further variations, the connector means 43 may be varied. For example, the hitch ball 46 may be replaced with a stub or projection to which a towed vehicle is connected.

Also, both the hitch ball 46 and platform 61 may be replaced with other connector constructions. For example, a vertically elongate square tube could be welded to the face of the main wall 48 in place of the platform 61. This tube would have vertically spaced apart holes, preferably in the side walls. Additional brackets or even the towed vehicle can be secured to the holes by pins, which brackets can be vertically adjustable. The height of the bracket can be varied depending on the holes being selected.

Figure 13:
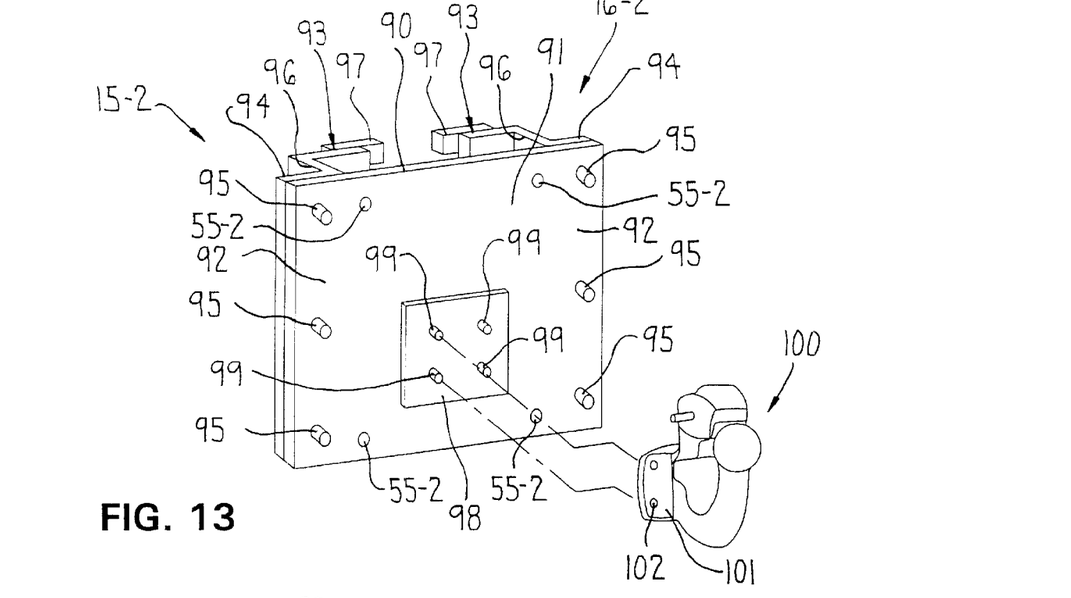
FIG. 13 is a perspective view illustrating a second alternate embodiment of the trailer hitch of the invention.
Figure 14:
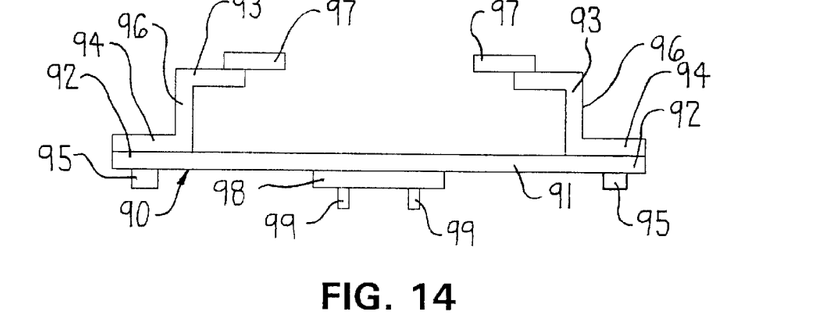
FIG. 14 is a plan view of the second alternate embodiment.

Referring to FIGS. 13 and 14, a second alternate embodiment of the hitch assembly 15 is illustrated and identified by reference numeral 15-2. The alternate hitch assembly 15-2 has a modified slide bracket 16-2. In this slide bracket 16-2, a front plate 90 is provided which is formed of rigid steel and defines a front wall 91 of the slide bracket 16-2 and side flanges 92 along the opposite side edges thereof.

Additionally, each of the side flanges 92 is fixedly connected to backing plates 93 by welds at the upper and lower ends thereof and by bolts 95. The backing plates 93 are bent into a stepped or Z-shape to define front mounting flanges 94 and side walls 96 whereby the mounting flanges 94 are bolted to the side flanges 92. The backing plates 93 further include lower limit stops 97 that are structurally and functionally the same as the stop blocks 70 described above.

Additionally, the front wall 91 includes locking holes 55-2 and a front mounting plate 98. The front mounting plate 98 includes four threaded lugs 99 projecting forwardly therefrom so that the mounting plate 98 serves as a hitch mount. For example, an adjustable pintle and adjustable ball mount hitch unit 100 may be provided. The hitch unit 100 includes mounting flanges 101 on the opposite sides thereof which have mounting holes 102 that align with the lugs 99 so that the hitch unit 100 is bolted to the lugs 99.

Figure 15:
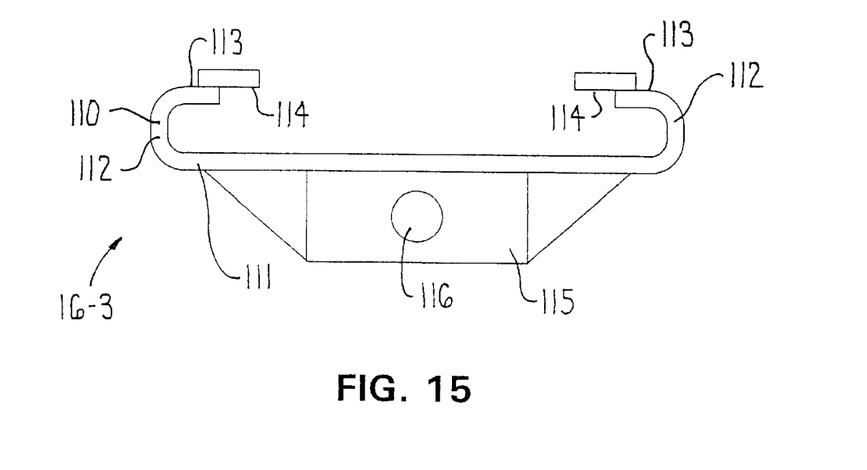
FIG. 15 is a plan view of a third alternate embodiment of the inventive trailer hitch.

Referring to FIG. 15, a still further alternate embodiment of a slide bracket is illustrated and identified by reference numeral 16-3. The slide bracket 16-3 is formed of a single continuous piece of shaped plate steel 110 which is shaped to define a front wall 111, side walls 112 and backing flanges 113. The backing flanges include lower stop blocks 114 which are substantially the same as the stop blocks 70.

The slide bracket 16-3 also includes an alternate mount unit 115 on the front face thereof. The mount unit 115 serves as a hitch mount and includes a bore 1116 to accommodate a hitch ball.

It will be understood that the slide brackets 16-2 and 16-3 provide improved constructions relative to the slide bracket 16 due to simplified manufacturing thereof. Otherwise, the slide brackets 16-2 and 16-3 function the same as the slide bracket 16 and thus, further description of the vertical adjustment and locking of the slide brackets 16-2 and 16-3 is not necessary.

Although particular embodiments of the invention have been disclosed in detail for illustrative purposes, it will be recognized that variations or modifications of the disclosed apparatus, including the rearrangement of parts, lie within the scope of the present invention.

What is claimed is:

1. A trailer hitch arrangement comprising:

a support unit which includes a vertically enlarged support member;

a hitch assembly having a slide bracket which is slidably engaged with the support member and a hitch engagement means for engaging a vehicle being towed, said hitch assembly further including upper and lower limit stops which define the respective upper and lower limits of travel of the slide bracket, said upper limit stop being located vertically below said lower limit stop when said slide bracket is at said upper limit of travel, one of said upper and lower limit stops being manually disengagable to permit removal of said slide bracket from the support member; and a lock member which removably secures said hitch assembly to said support unit at a selected elevation.

2. The hitch arrangement according to claim 1, wherein said lower limit stop is a fixed stop which is active in case said slide bracket is inadvertently dropped, and said upper limit stop is manually disengagable so that said slide bracket is removable from said support member by raising said slide bracket upwardly.

3. The hitch arrangement according to claim 1, wherein said support member includes at least one row of vertically spaced apart apertures and said lock member is engagable with said apertures at selected elevations to vary an elevational height of said slide bracket, said slide bracket including at least an upper aperture and a lower aperture through which said lock member is inserted into selected engagement with a selected one of said apertures of said row, said lock member being inserted into said upper aperture to increase downward travel of said slide bracket relative to said support member and said lock member being inserted into said lower aperture to increase upward travel to said slide bracket.

4. The hitch arrangement according to claim 1, wherein said support member includes at least one row of vertically spaced apart apertures and said slide bracket includes at least one aperture which is aligned with said row of apertures in said support member, said lock member being insertable into said aperture of said slide bracket and a selected one of said row of apertures in said support member to maintain said hitch assembly at a selected elevation.

5. A trailer hitch arrangement comprising:

a support unit which includes a first vehicle connector and a support member that extends vertically and is rigidly supported on said first vehicle connector;

a slide assembly having a slide bracket which is connected to said support member so as to be movable vertically along an adjustment path, said slide bracket including a second vehicle connector wherein one of said first and second vehicle connectors is mountable to a towing vehicle and the other of said first and second vehicle connectors is mountable to a vehicle being towed and said slide bracket further including an upper section and a lower section disposed below said upper section;

upper and lower limit stops being provided which are engaged between said support unit and said slide bracket to define respective upper and lower limits of travel of said slide bracket, said lower limit stop acting between said support unit and said upper bracket section and said upper limit stop acting between said support unit and said lower bracket section when said slide bracket is positioned respectively at said lower and upper limits of travel, at least one of said upper and lower limit stops being disengagable to permit removal of said slide bracket from said support member; and a lock arrangement which is removably engaged between said slide bracket and said support member to maintain said slide bracket at a selected elevation and disengagable to permit adjustment of the elevation of said first vehicle connector relative to said second vehicle connector.

6. The hitch arrangement according to claim 5, wherein said lower limit stop is disposed at an upper end of said slide bracket and abuts against said support unit at said lower limit of travel to limit downward movement of said slide bracket.

7. The hitch arrangement according to claim 6, wherein said upper limit stop is manually disengagable to permit removal of said slide bracket upwardly from said support member.

8. The hitch arrangement according to claim 5, wherein said upper limit stop is a movable projection fixedly secured to an upper end of said support member and is movable into engagement with a corresponding opening formed in said slide bracket.

9. The hitch arrangement according to claim 8, wherein said projection is a spring-loaded pin.

10. The hitch arrangement according to claim 5, wherein said lower stop is a rigid projection which abuts against said support unit to limit downward movement of said slide bracket, said upper stop being manually disengagable to permit removal of said slide bracket from said support plate when said upper stop is disengaged.

11. A trailer hitch arrangement comprising:

a support unit which includes a support member that extends vertically and a first vehicle connector which is rigidly supported on said support member;

a slide assembly having a slide bracket which is connected to said support member so as to be movable vertically along an adjustment path, said slide bracket including an open channel and said support member being telescopically received within said channel, said slide bracket further including a second vehicle connector wherein one of said first and second vehicle connectors is mountable to a towing vehicle and the other of said first and second vehicle connectors is mountable to a vehicle being towed;

a lock arrangement which is engaged between said slide bracket and said support member to maintain said slide bracket at a selected elevation and is disengagable to permit adjustment of the elevation of said first vehicle connector relative to said second vehicle connector; and upper and lower stops being provided which are engaged between said support unit and said slide bracket to define respective upper and lower limits of travel of said slide bracket, at least one of said upper and lower stops being disengagable to permit removal of said slide bracket from said support member.

12. A trailer hitch arrangement comprising:

a support unit which includes a vehicle connector for connecting the trailer hitch arrangement to a towing vehicle, said support unit including a vertically elongate support member, and said support unit further including upward facing stop surfaces;

a hitch assembly having a slide bracket which is movably engaged with said support member so as to be movable vertically relative thereto, said hitch assembly including a hitch mount which is fixedly supported on said slide bracket so as to be movable vertically therewith and is connectable to a hitch of a vehicle being towed, said slide bracket including upper and lower stops which respectively define upper and lower limits of travel of said slide bracket, said lower stop including downward facing stop surfaces which abut against and rest upon said upward facing stop surfaces of said support unit to limit downward movement of said slide bracket, said upper stop of said hitch assembly including an upward facing stop surface wherein said support member includes a projection which abuts against said upward facing stop surface at the upper limit of travel of said slide bracket; and a lock member which is movable between an engaged position wherein said lock member engages said slide bracket and said support member to prevent vertical movement of said slide bracket and maintain said slide bracket at a selected elevation between said upper and lower limits of travel, and a disengaged position wherein said lock member permits vertical movement of said slide bracket to adjust said selected elevation.

13. The hitch arrangement according to claim 12, wherein said lock member is a fixed pin and said slide bracket includes an open-ended slot wherein a lower end of said slot defines said upward facing stop surface, said pin being slidable vertically along said slot during vertical movement of said slide bracket.

14. The hitch arrangement according to claim 13, wherein said pin is removable to permit removal of said slide bracket from said support member.

15. The hitch arrangement according to claim 12, wherein said lock member is a movable pin which is manually movable between said engaged and disengaged positions.

16. The hitch arrangement according to claim 15, wherein said slide bracket includes a closed-ended slot wherein a lower end of said closed-ended slot defines said upward facing stop surface.

17. The hitch arrangement according to claim 16, wherein said pin is normally biased to said engaged position and slides along an inside face of said slide bracket until said pin is aligned with said closed-ended slot wherein said pin moves to said engaged position within said slot.

18. The hitch arrangement according to claim 12, wherein said slide bracket includes a vertical channel therein which telescopically receives said support member.

19. The hitch arrangement according to claim 18, wherein said channel includes a central opening through which said vehicle mount of said support member projects rearwardly and is slidable vertically.

20. The hitch arrangement according to claim 18, wherein said support member includes a support post projecting from a back face thereof, said vehicle mount being defined on said support post having an upward facing top surface which defines said upward facing stop surfaces, said lower stops of said slide bracket being rigid projections which define said downward facing stop surface and support a weight of said hitch assembly in any vehicles being towed thereby.

21. A trailer hitch arrangement comprising:

a support unit which includes a vertically enlarged support member, said support member including vertically spaced apart apertures arranged in at least one row;

a hitch assembly having a slide bracket which is slidably engaged with the support member and hitch engagement means for engaging a vehicle being towed, said slide bracket further including at least an upper aperture and a lower aperture, said hitch assembly further including upper and lower stops which define the respective upper and lower limits of travel of the slide bracket, one of said upper and lower stops being manually disengagable to permit removal of said slide bracket from the support member; and a lock member which removably secures said hitch assembly to said support unit at a selected elevation, said lock member being engagable with a selected one of said apertures of said support member and a selected one of said upper and lower apertures of said slide bracket at a selected elevation to vary an elevational height of said slide bracket, said lock member being inserted either into said upper aperture to increase downward travel of said slide bracket relative to said support member or into said lower aperture to increase upward travel of said slide bracket relative to said support member.

22. A trailer hitch arrangement comprising:

a support unit which includes a vertically enlarged support member, said support member including vertically spaced apart apertures arranged in at least one row;

a hitch assembly having a slide bracket which is slidably engaged with the support member and hitch engagement means for engaging a vehicle being towed, said slide bracket including at least one aperture which is aligned with said row of apertures in said support member, said hitch assembly further including upper and lower stops which define the respective upper and lower limits of travel of the slide bracket, one of said upper and lower stops being manually disengagable to permit removal of said slide bracket from the support member; and a lock member which removably secures said hitch assembly to said support unit at a selected elevation, said lock member being insertable into said aperture of said slide bracket and a selected one of said row of apertures in said support member to maintain said hitch assembly at a selected elevation.

23. A trailer hitch arrangement comprising:

a support unit which includes a vertically enlarged support member having upper and lower edges;

a hitch assembly having a slide bracket which is slidably engaged with the support member and a hitch engagement unit adapted to engage a vehicle being towed, said hitch assembly further including upper and lower stops which define the respective upper and lower limits of travel of the slide bracket, one of said upper and lower stops being manually disengagable to permit removal of said slide bracket from the support member, said slide bracket having upper and lower end sections wherein said upper end section projects vertically above said upper support member edge when said slide bracket is at said upper limit of travel and said lower end section projects vertically below said lower support member edge when said slide bracket is at said lower limit of travel; and a lock member which removably secures said hitch assembly to said support unit at a selected elevation.

24. The hitch arrangement according to claim 23, wherein said lower stop is a fixed stop which is active in case said slide bracket is inadvertently dropped, and said upper stop is manually disengagable so that said slide bracket is removable from said support member by raising said slide bracket upwardly.

25. A trailer hitch arrangement comprising:

a support unit which includes a vertically elongate support member and a vehicle connector post which is connected to a back face of said support member and projects forwardly away from said back face for connecting the trailer hitch arrangement to a towing vehicle, said support unit having a brace which extends horizontally and vertically and is connected between said connector post and said back face of said support member to support a vertically elongate section of said support member, said support member having opposite side edges which extend vertically and are rigid and having vertically spaced apart upper and lower edges which extend sidewardly between said opposite side edges, said support member further having vertically spaced apart lock apertures which open rearwardly;

a hitch assembly having a slide bracket which is vertically elongate and slidably engaged with said support member so as to be movable vertically relative thereto, said slide bracket having a face plate, opposite side walls which project rearwardly from said face plate and back flanges which extend inwardly from said side walls generally parallel to said face plate to form opposed mounting channels defined interiorly of said side walls, said mounting channels being slidably engaged with said opposite side edges of said support member, and said back flanges being sidewardly spaced apart such that said connector post projects forwardly through the space defined between said back flanges, said face plate including a hitch mount which is fixedly supported on an outer face of said face plate and is adapted to permit connection with a hitch of a vehicle being towed, and including at least one bracket aperture extending forwardly therethrough, said slide bracket having an upper bracket section which projects vertically above said upper edge of said support member in telescoping relation when at an upper limit of travel and a lower bracket section which projects vertically below said lower edge of said support member in telescoping relation when at a lower limit of travel wherein loads applied to said hitch mount are supported by engagement of said support member side edges within said channels and one of said upper and lower bracket sections remains engaged with said support member to support said loads; and a lock member which is insertable through said bracket aperture into one of said lock apertures to maintain said slide bracket at a selected elevation between said upper and lower limits of travel, said lock member being disengagable to permit vertical movement of said slide bracket to adjust said selected elevation.

26. The hitch assembly according to claim 25, wherein said lower bracket section includes a first said bracket aperture and said upper section includes a second said bracket aperture wherein said lock member is engaged with said lower bracket aperture when said slide bracket is at said upper travel limit and said lock member is engaged with said upper bracket aperture when said slide bracket is at said lower travel limit.

27. The hitch assembly according to claim 25, wherein said gusset engages said support member in an engagement region between said slide bracket and said support member.

* * * * *